(12) United States Patent
Davies et al.

(10) Patent No.: US 11,143,221 B2
(45) Date of Patent: Oct. 12, 2021

(54) SECURING MECHANISM FOR DEVICE HOUSING

(71) Applicant: Facebook, Inc., Menlo Park, CA (US)

(72) Inventors: Joshua Davies, Oakland, CA (US); Way Chet Lim, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 161 days.

(21) Appl. No.: 16/575,129

(22) Filed: Sep. 18, 2019

(65) Prior Publication Data

US 2020/0109726 A1    Apr. 9, 2020

Related U.S. Application Data

(60) Provisional application No. 62/742,183, filed on Oct. 5, 2018.

(51) Int. Cl.
 *F16B 5/02*    (2006.01)
(52) U.S. Cl.
 CPC ..................................... *F16B 5/02* (2013.01)
(58) Field of Classification Search
 CPC .... F16B 5/02; F16B 5/0614; Y10T 29/49826; Y10T 29/49876; Y10T 29/49892; Y10T 29/49895; Y10T 29/49904; Y10T 29/49936; Y10T 29/49947; Y10T 29/53
 See application file for complete search history.

(56) References Cited

U.S. PATENT DOCUMENTS

| | | | | |
|---|---|---|---|---|
| 3,466,072 A | * | 9/1969 | Andrews | A61K 31/215 |
| | | | | 52/587.1 |
| 5,123,680 A | * | 6/1992 | Liu | F16B 2/243 |
| | | | | 24/625 |
| 5,660,297 A | * | 8/1997 | Liu | G06F 1/181 |
| | | | | 220/4.02 |

\* cited by examiner

*Primary Examiner* — Jason L Vaughan
*Assistant Examiner* — Amanda Kreiling
(74) *Attorney, Agent, or Firm* — Fenwick & West LLP (57) ABSTRACT

A device housing comprises a front panel, a back panel, and a support structure. The front panel further comprises at least one threaded interface position on an edge of the front panel. The back panel further comprises at least one securing interface positioned on an edge of the back panel. The support structure is configured to mount the front panel and the back panel. The support structure further comprises a slot configured to couple the threaded interface on the front panel and a securing to configured to couple the securing interface on the back panel.

20 Claims, 8 Drawing Sheets

SECURING MECHANISM FOR DEVICE HOUSING

CROSS REFERENCE TO RELATED APPLICATIONS

This application claims the benefit of U.S. Provisional Application No. 62/742,183, filed Oct. 5, 2018, which is incorporated by reference in its entirety.

BACKGROUND

This disclosure relates generally to a securing mechanism, and specifically to a securing mechanism for removably coupling mating components of a housing.

Most objects having a housing that includes two or more components that are secured together. Standard methods for securing housing components together typically use mechanical fasteners such as screws and reciprocal threaded interfaces, bolts and rivets, snap joints, or other similar mechanical fasteners. However, several of these fasteners are visible on the outside of the housing, and snap joints may break after repeated attachment and removal of the housing components to and from each other. Accordingly, there is a need for a durable securing mechanism that can attach housing components together without being visible.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
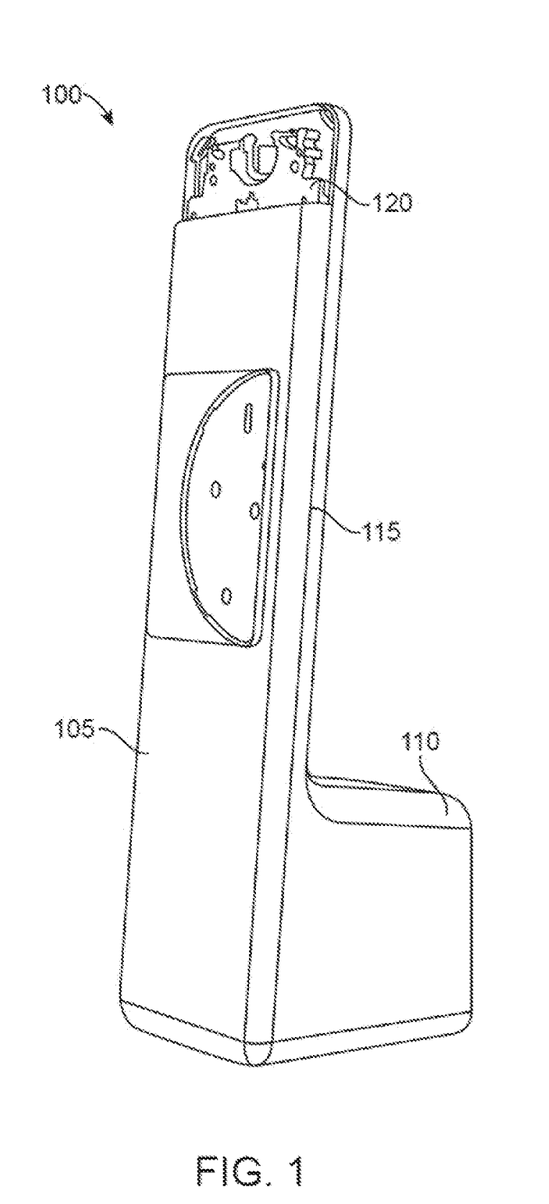
FIG. 1 is a perspective view of an example housing, in accordance with one or more embodiments.

FIG. 1A is a perspective view of an example housing 100, in accordance with one or more embodiments. The housing 100 may be used as a base for mounting objects, a support structure, or other suitable uses. In the embodiment of FIG. 1A, the housing 100 includes a front panel 105 and a back panel 110. As illustrated in FIG. 1A, the front panel 105 and the back panel 110 are relatively long and planar and have straight edges. The front panel 105 and the back panel 110 mate along one or more corresponding edges, creating a seam 115. The front panel 105 and the back panel 110 are coupled together such that the corresponding edges are substantially flush with each other. Specifically, the front panel 105 and the back panel 110 are coupled to a support structure 120, which is an internal component within the housing 100 on which various components may be mounted. Internal surfaces of the respective panels are coupled to the support structure 120 using securing mechanisms (shown in FIGS. 2AB) that are designed to draw the front panel 105 and the back panel 110 in towards each other. In this configuration, the housing 110 can be assembled without securing mechanisms and/or interfaces on external surfaces of the housing 110 and the appearance of the seam 115 is minimal. The front panel 105 and the back panel 110 may be composed of rigid materials, e.g. metal or hard plastics.

While housing components are used as an example throughout, the securing mechanism may be configured to couple a number of different types of components together along a seam and/or along a plane of the components.

Figure 2A:
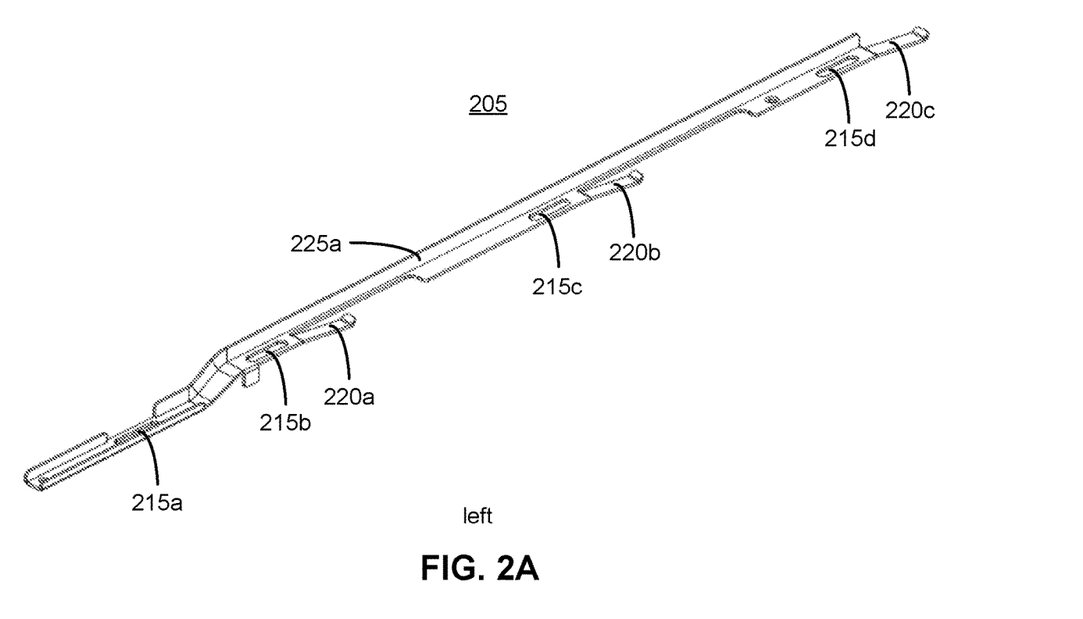
FIGS. 2A-2B illustrate left and right embodiments of a securing mechanism for assembling the housing of FIG. 1A, in accordance with one or more embodiments.
Figure 2B:
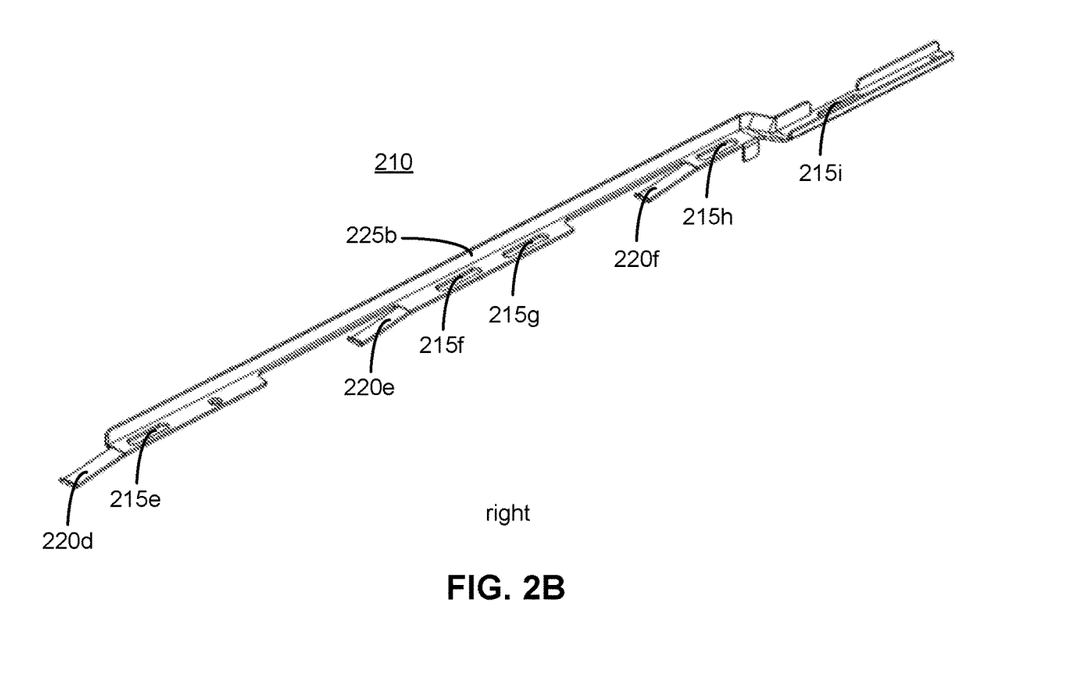

FIGS. 2A-2B illustrate left and right mounting plates, respectively, of securing mechanisms for assembling the housing of FIG. 1A, in accordance with one or more embodiments. Generally, the securing mechanism is designed to removably couple components to the support structure 120. Each securing mechanism includes a mounting plate (e.g., 205, 210) that is designed to couple to internal surfaces of the front panel 105 and the back panel 110. Each securing mechanism further includes a plurality of screws (not shown) that mate with corresponding threaded interfaces (not shown) to secure the mounting plate 205, 210 to the support structure 120 and to either the front panel 105 or the back panel 110. In the embodiment of FIGS. 2A-2B, each mounting plate 205, 210 has a thin form-factor, enabling the mounting plate 205, 210 to be positioned between the front panel 105 and the back panel 110 and draw the two components towards the support structure 120, thereby minimizing the appearance of the seam 115 between the two components when coupled to the support structure 120. As illustrated in FIGS. 2A-2B, each mounting plate 205, 210 is substantially rectangular-shaped and includes one or more portions that are complementary to the internal surfaces of the support structure 120, the front panel 105, and/or the back panel 110. In alternate embodiments, the mounting plates 205, 210 may have different geometry and/or orientations such that the mounting plates 205, 210 are flush against the internal surfaces of the support structure 120, the front panel 105, and/or the back panel 110.

Each mounting plate 205, 210 is designed to mount a first panel (the front panel 105 or the back panel 110) to the support structure 120 and interface with a second panel (the back panel 110 or the front panel 105) to couple the second panel to the support structure 120. Each mounting plate 205, 210 is further designed to move relative to the support structure 120 to transition between an unlocked position and a locked position to couple and decouple the second panel to the support structure 120. In the embodiment of FIGS. 2A-2B, each mounting plate 205, 210 includes a plurality of slots 215 and a plurality of securing tabs 220. Each slot 215 receives a screw to mount the first panel to the mounting plate 205, 210, where the support structure 120 is coupled between and has corresponding holes for the screw to pass through. Each mounting plate 205, 210 may include several slots 215 that are spaced out (randomly or at specific intervals) along the length of the mounting plate 205, 210. The screws couple the mounting plates 205, 210 to the support structure 120 such that the mounting plates 205, 210 abut a surface of the support structure 120 but are also allowed to move relative to the support structure 120. Specifically, the mounting plates 205, 210 translate along an axis of the slots 215. The securing tabs 220 couple with respective securing interfaces on the second panel to couple the second panel to the support structure 120. This configuration enables each mounting plate 205, 210 to transition between the unlocked position, in which the securing tabs 220 are not coupled with the respective securing interfaces, and the locked position, in which the securing tabs 220 are coupled with the respective securing interfaces. The unlocked and locked positions of the mounting plates 205, 210 are discussed in further detail with regards to FIGS. 4A-4B.

In some embodiments, each mounting plate 205, 210 includes an outer wall 225 that abuts a portion of the support structure 120. For example, in an embodiment where the front panel 105 includes the threaded interfaces for securing the mounting plates 205, 210, the left mounting plate 205 is designed to be placed along a left edge of the support structure 120 (and thus the left edge of the front panel 105), and the right mounting plate 210 is designed to be placed along a right edge of the front panel 105 and the support structure 120 (and thus the right edge of the front panel 105), wherein the respective outer wall 225 of the mounting plates 205, 210 abuts an edge of the support structure 120 and the front panel 105. The outer wall 225 may help align the mounting plates 205, 210 to be secured to the support structure 120 and the front panel 105 via the screws (not shown) and respective threaded interfaces. In an alternate embodiment, the back panel 110 may include the threaded interfaces for securing the mounting plates 205, 210.

While left and right embodiments of the securing mechanism are described throughout, alternate embodiments may include a top embodiment and a bottom embodiment of the securing mechanism. Alternate embodiments may include securing mechanisms that are positioned at an angle or that generally align with the geometry of a seam of a housing. In some embodiments, more than two securing mechanisms may be used to couple the front panel 105 and the back panel 110 to the support structure 120. In some embodiments, the front panel 105 and/or the back panel 110 may be composed of more than one segment that are each designed to couple to the support structure 120 via an individual securing mechanism.

Figure 3A:
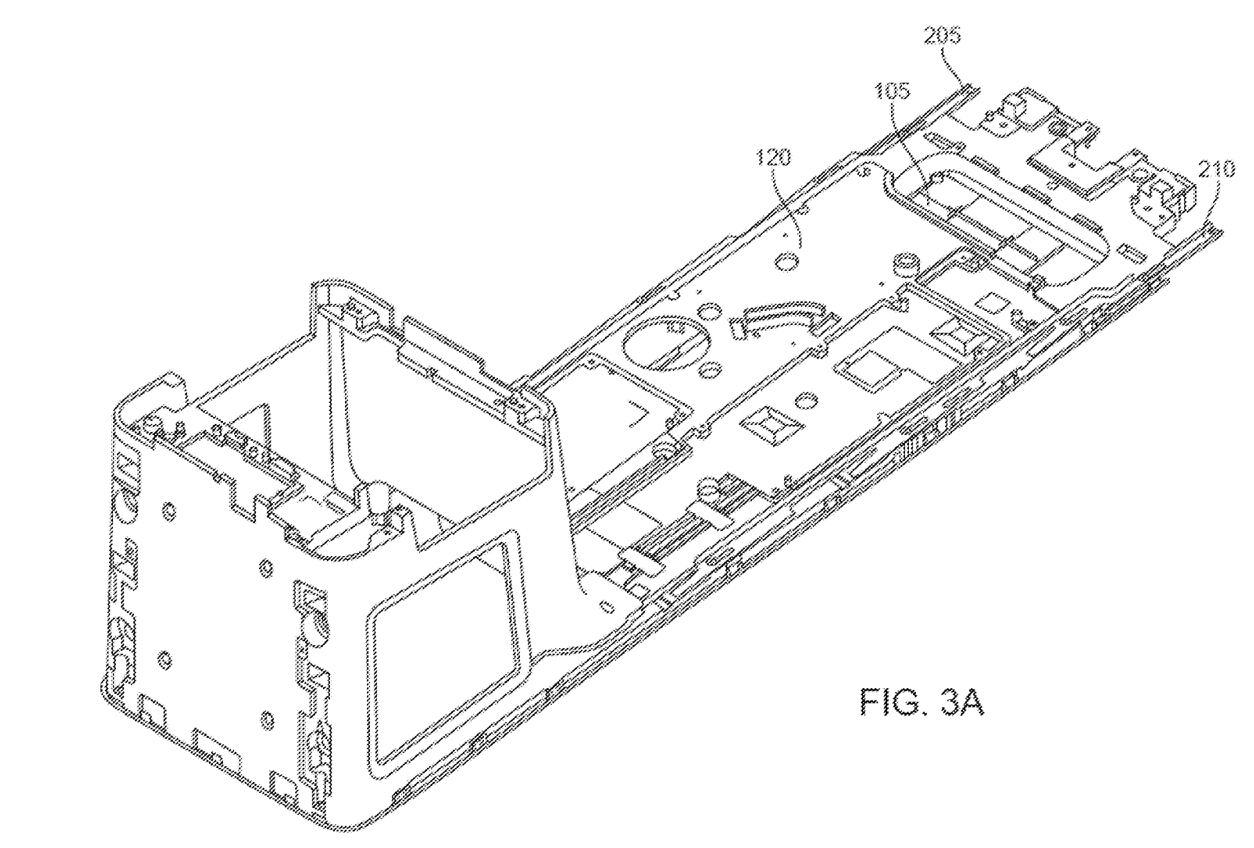
FIG. 3A is a perspective view of the housing of FIG. 1A with a portion of the housing removed, in accordance with one or more embodiments.
Figure 3B:
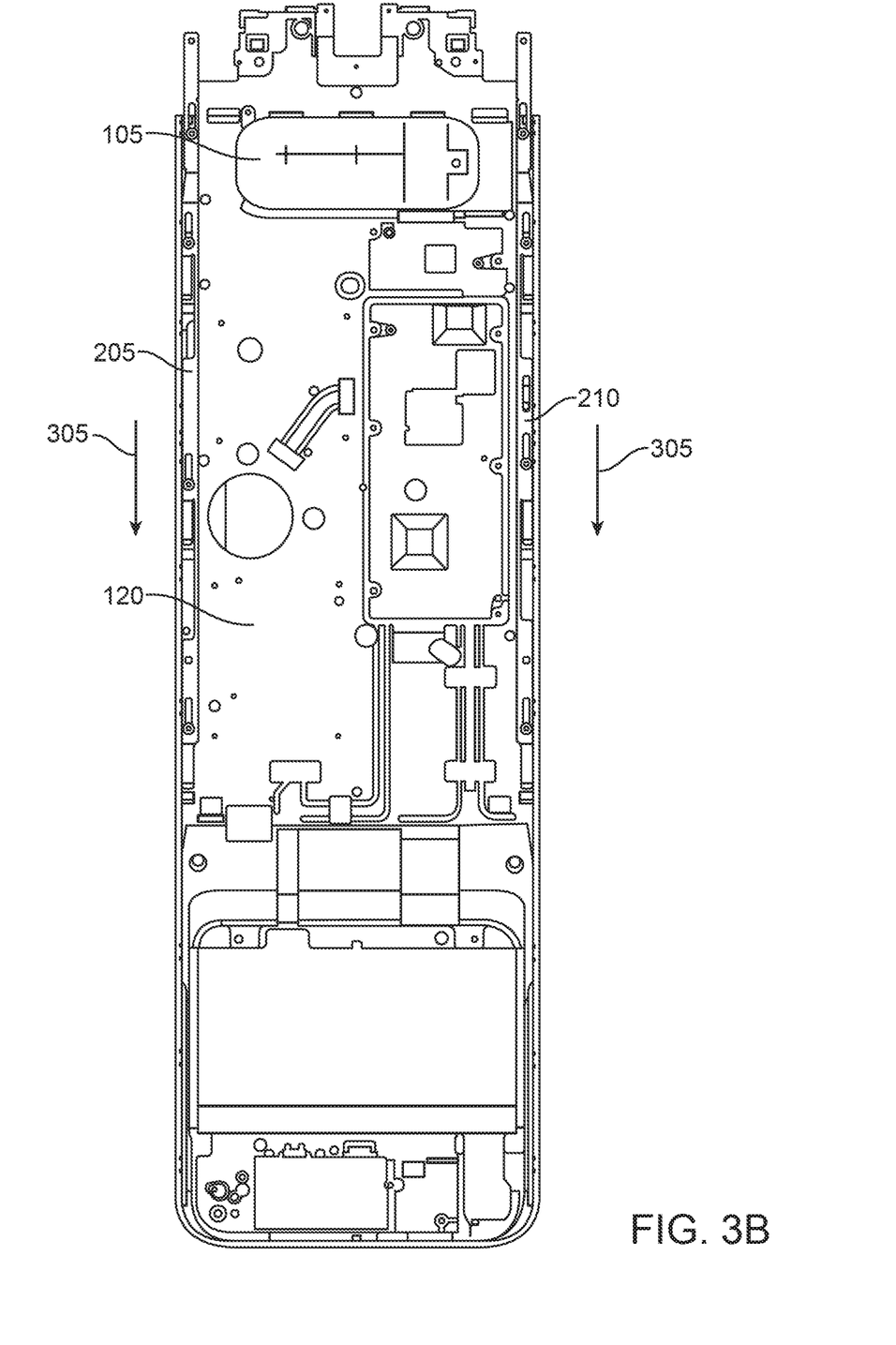
FIG. 3B is a side view of the housing of FIG. 1A with a portion of the housing removed, in accordance with one or more embodiments.

FIG. 3A is a perspective view and FIG. 3B is a side view, each of the housing of FIG. 1A with a portion of the housing 100 removed, in accordance with one or more embodiments. In FIGS. 1B-1C, the back panel 110 is removed to expose the support structure 120. As previously described, the support structure 120 is an internal component within the housing 100 on which various components may be mounted. In the embodiment of FIGS. 3A-3B, the front panel 105 is coupled to the support structure 120 via left and right securing mechanisms. The left mounting plate 205 is illustrated at a left edge of the support structure 120, and the right mounting plate 210 is illustrated at a right edge of the support structure 120. The support structure 120 includes a plurality of holes and the front panel 105 includes a plurality of threaded interfaces that each correspond to the placement of the slots 215 on the mounting plates 205, 210. Screws of the securing mechanisms are placed through the slots 215, pass through the holes on the support structure 120, and mate with the threaded interfaces on the front panel 105. In this configuration, the mounting plates 205, 210 are mounted to the front panel 105 with the support structure 120 coupled between such that the mounting plates 205, 210 can move relative to the support structure 120. In FIGS. 3A-3B, the mounting plates 205, 210 are illustrated in an unlocked position, and the mounting plates 205, 210 are designed to translate in a downward direction (i.e., towards the bottom of the support structure 120), represented by arrow 305.

Figure 4A:
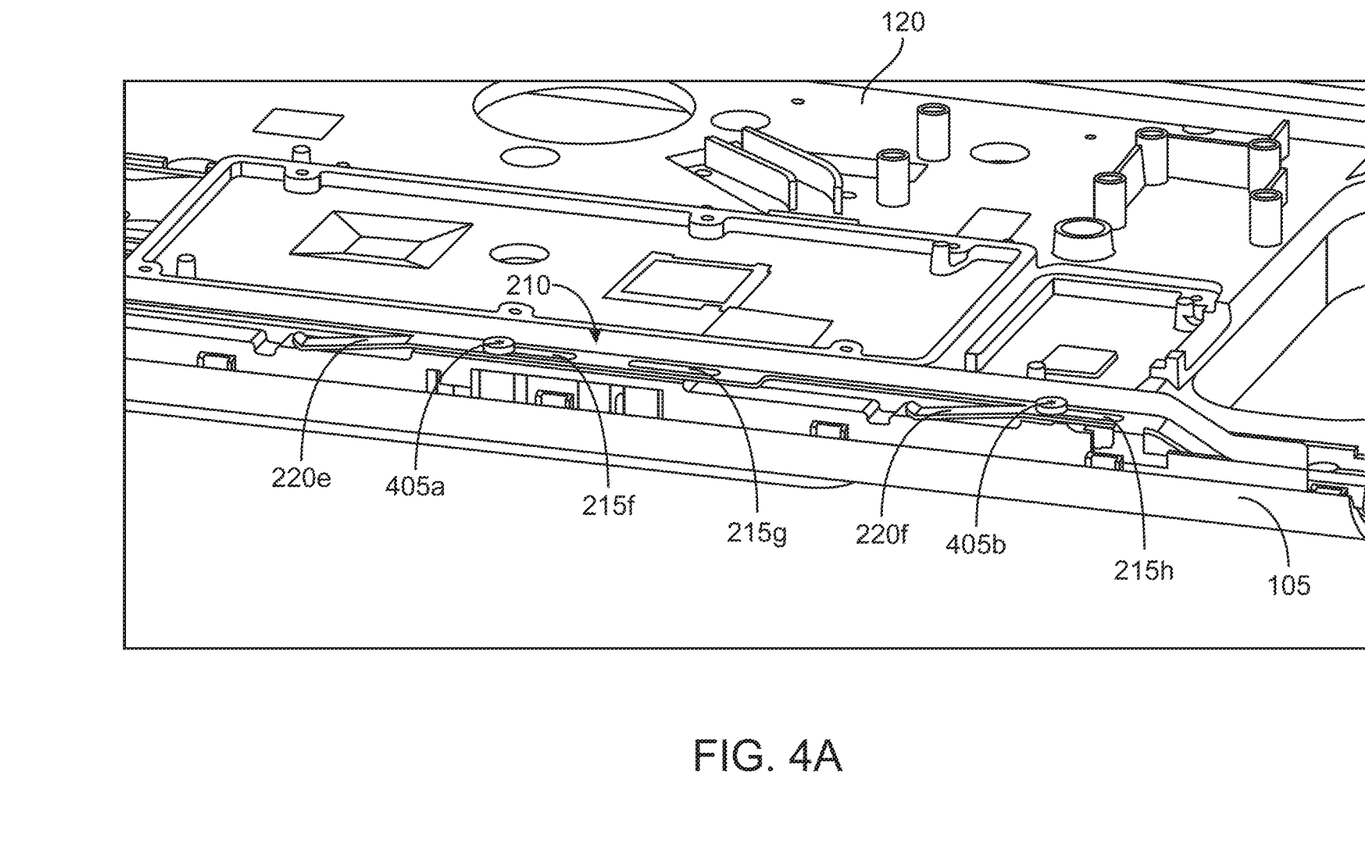
FIG. 4A illustrates a zoomed-in, perspective view of an embodiment of the securing mechanism with a portion of the housing of FIG. 1A removed, in accordance with one or more embodiments.

FIG. 4A illustrates a zoomed-in, perspective view of an embodiment of the securing mechanism with a portion of the housing 100 of FIG. 1A removed, in accordance with one or more embodiments. In the embodiment of FIG. 4A, the back panel 110 of the housing 100 is removed to expose the right securing mechanism coupled to the support structure 120 and the front panel 105. As described with regards to FIGS. 3A-3B, the mounting plate 210 is mounted to the front panel 105 using a plurality of screws 405, with the support structure 120 coupled in between. The screws 405 position the mounting plate 210 against the support structure 120 while enabling the mounting plate 210 to move relative to the support structure 120. FIG. 4A illustrates the mounting plate 210 in the unlocked position.

Figure 4B:
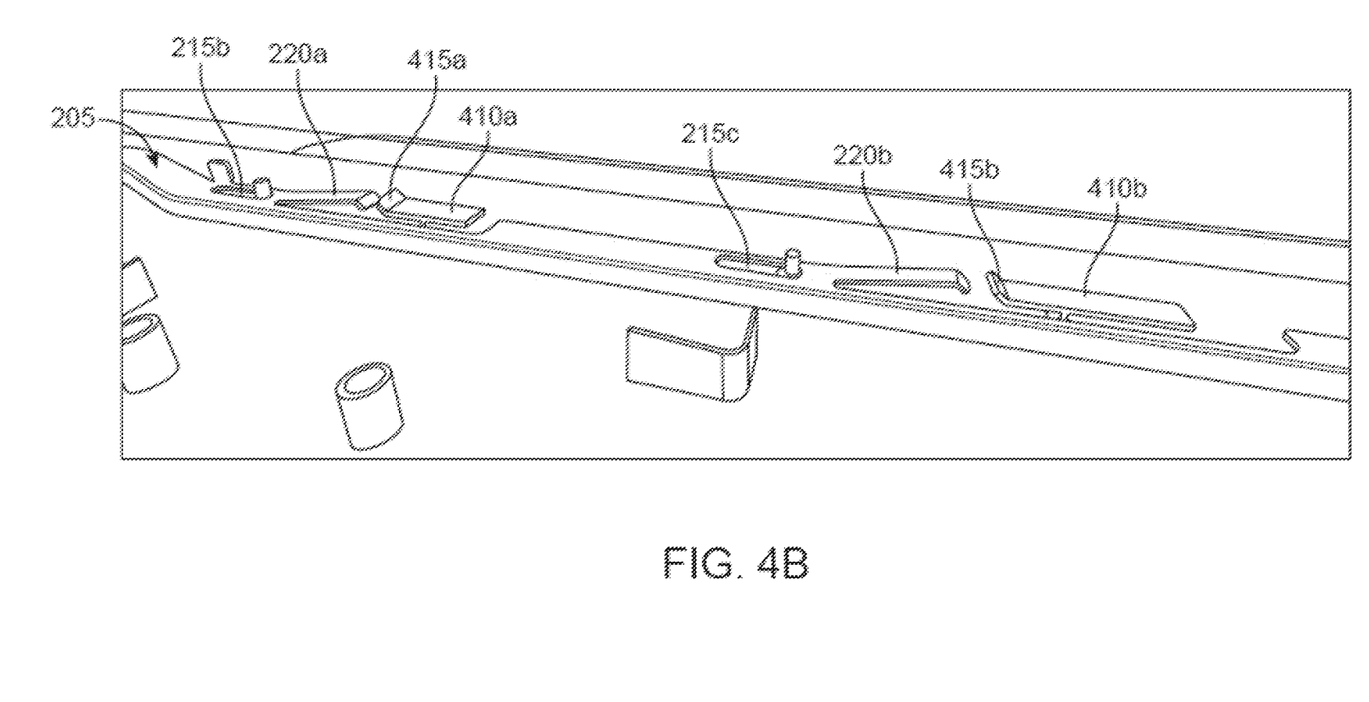
FIG. 4B illustrates a zoomed-in, perspective view of an embodiment of the securing mechanism with a portion of the housing of FIG. 1A removed, in accordance with one or more embodiments.

FIG. 4B illustrates a zoomed-in, perspective view of an embodiment of the securing mechanism with a portion of the housing of FIG. 1A removed, in accordance with one or more embodiments. In the embodiment of FIG. 4B, the front panel 105 of the housing 100 is removed to expose the left securing mechanism against the back panel 110. FIG. 4B illustrates a plurality of respective securing interfaces 410 on the back panel 110 and the mounting plate 205 in the unlocked position. The securing tabs 220 are configured to couple with securing interfaces 410 when the mounting plate 205 is in the locked position. Each securing interface 410 comprises a protruding tab 415 that mates with an end of a corresponding securing tab 220. In the embodiment of FIG. 4B, both the protruding tab 415 and the end of the corresponding securing tab 220 are angled such that the mounting plate 205 is secured in the locked position.

Figure 5A:
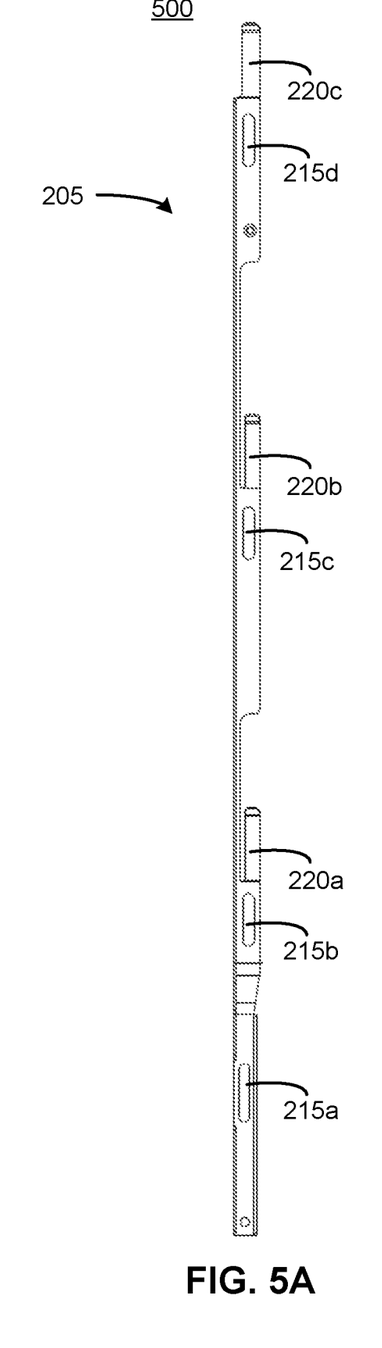
FIGS. 5A-5B illustrate a first side view and a second side view of the left embodiment of the securing mechanism of FIG. 2A, in accordance with one or more embodiments.
Figure 5B:
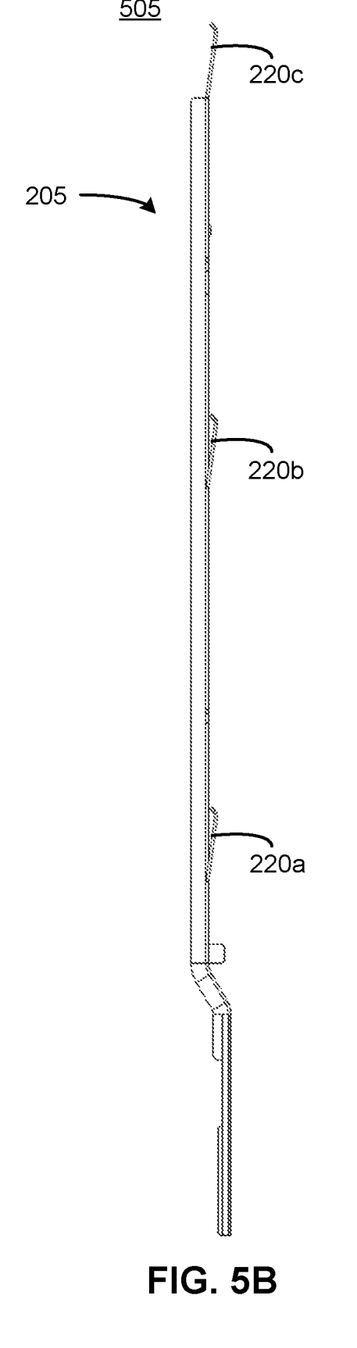

FIGS. 5A-5B illustrate a first side view 500 and a second side view 505 of the left mounting plate 205 of the securing mechanism of FIG. 2A, in accordance with one or more embodiments. As illustrated in FIGS. 5A-5B, the securing tabs 220 protrude out of a plane of the mounting plate 205. In this configuration, the securing tabs 220 create a spring force upon the surface of the support structure 120, which draws components of the housing 100 towards each other when coupled. Specifically, the securing tabs 220 are biased such that, when the mounting plate 205 is coupled to the support structure 120, the securing tabs 220 push against the support structure 120, thereby pulling the front panel 105 closer towards the support structure 120. In addition, when the mounting plate 205 is in the locked position such that the securing tabs 220 are coupled with the respective securing interfaces 410 on the back panel 110, the mounting plate 205 and the back panel 110 are also drawn closer towards each other. As a result, the seam 115 between the front panel 105 and the back panel 110 is minimized.

Figure 6A:
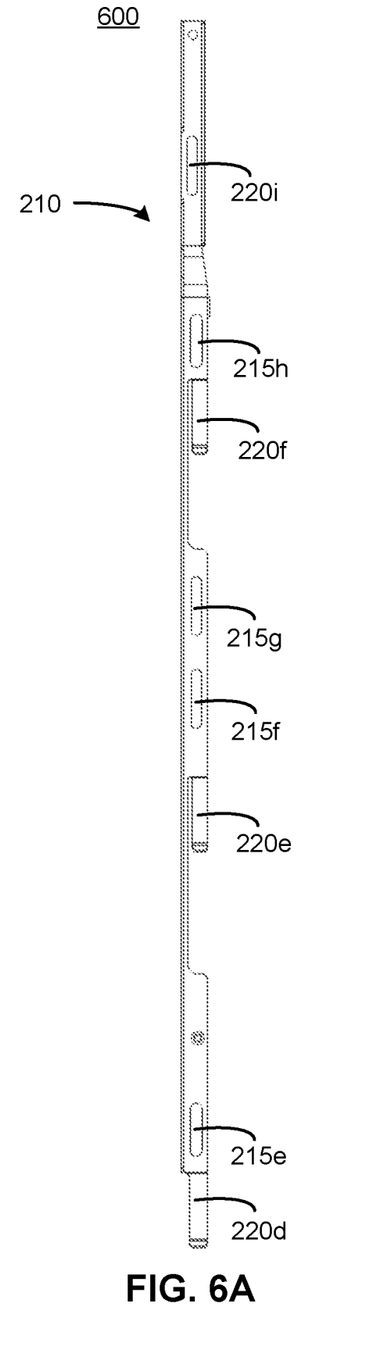
FIGS. 6A-6B illustrate a first side view and a second side view of the right embodiment of the securing mechanism of FIG. 2B, in accordance with one or more embodiments.
Figure 6B:
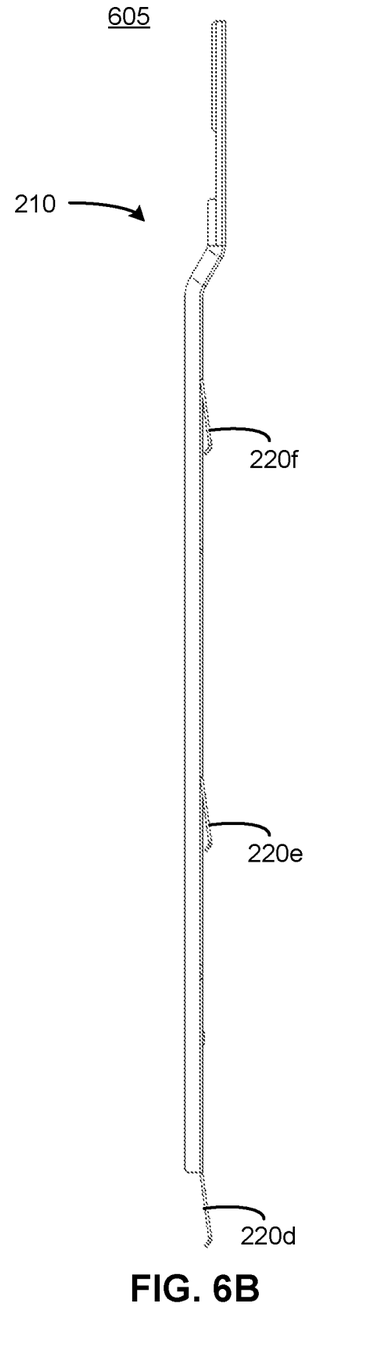

FIGS. 6A-6B illustrate a first side view 600 and a second side view 605 of the right mounting plate 210 of the securing mechanism of FIG. 2B, in accordance with one or more embodiments. Similar to the left mounting plate 205, the right mounting plate 210 includes securing tabs 220 that protrude out of the plane of the mounting plate 110, thereby drawing the components of the housing 100 towards each other when coupled.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A device housing comprising:
a front panel comprising at least one threaded interface positioned on an edge of the front panel;
a back panel comprising at least one securing interface positioned on an edge of the back panel; and
a support structure configured to mount the front panel and the back panel, wherein the support structure comprises a mounting plate, the mounting plate comprising:
a slot configured to couple the threaded interface on the front panel, and
a securing tab configured to couple the securing interface on the back panel.

2. The device housing of claim 1, wherein the support structure is coupled to the mounting plate by a screw passing through the slot in the mounting plate and a hole in the support structure, the hole aligned with the slot.

3. The device housing of claim 1, wherein the support structure and the mounting plate are coupled to the front panel by a screw passing through the threaded interface on the front panel, the slot in the mounting plate, and a hole in the support structure, the threaded interface aligned with the slot and the hole.

4. The device housing of claim 3, wherein the mounting plate comprises an outer wall configured to abut the support structure to align the hole in the support structure, the slot in the mounting plate, and the threaded interface on the front panel.

5. The device housing of claim 1, wherein the support structure is coupled between the mounting plate and the front panel be a screw passing through the threaded interface and the slot.

6. The device housing of claim 1, wherein the mounting plate translates along an axis of the slot to transition between a locked position at which the securing tab is coupled to the securing interface on the back panel and an unlocked position at which the securing tab is uncoupled to the securing interface on the back panel.

7. The device housing of claim 1, wherein a translation of the mounting plate along the axis of the slot causes a protruding tab of the securing interface on the back panel to couple to the securing tab on the mount plate.

8. The device housing of claim 1, wherein coupling the securing tab on the mounting plate to the securing interface on the back housing causes the mounting plate to pull the front panel and the back panel towards the support structure.

9. A device housing comprising:
a front panel comprising a plurality of threaded interfaces positioned along a left edge and a right edge of the front panel;
a back panel comprising a plurality of securing interfaces positioned along a left edge and a right edge of the front panel; and
a support structure configured to mount the front panel and the back panel, wherein the support structure is coupled to a securing mechanism comprising a left mounting plate and a right mounting plate, each of the left and right mounting plate further comprising:
a plurality of slots configured to couple to the threaded interfaces on the front panel, wherein each slot of the plurality corresponds to a threaded interface; and
a plurality of securing tabs configured to couple to the securing interfaces on the back panel, wherein each securing tab corresponds to a securing interface.

10. The device housing of claim 9, wherein:
the support structure is coupled to the left mounting plate by screws passing through each slot in the left mounting plate and a corresponding hole in a left edge of the support structure, wherein each slot is aligned with the corresponding hole; and
the support structure is coupled to the right mounting plate by screws passing through each slot of the right mounting plate and a corresponding hole in a right edge of the support structure, wherein each slot is aligned with the corresponding hole.

11. The device housing of claim 9, wherein:
the support structure and the left mounting plate are coupled to the front panel by a screw passing through each threaded interface on the left edge of the front panel, a corresponding slot on the left mounting plate, and a corresponding hole on a left edge of the support structure, wherein each threaded interface is aligned with the corresponding slot and the corresponding hole; and the support structure and the right mounting plate are coupled to the front panel by a screw passing through each threaded interface on the right edge of the front panel, a corresponding slot of the right mounting plate, and a corresponding hole on a right edge of the support structure, wherein each threaded interface is aligned with the corresponding slot and the corresponding hole.

12. The device housing of claim 9, wherein each of the left mounting plate and the right mounting plate comprise an outer wall configured to abut the support structure to align each threaded interface on the front panel with a corresponding slot in the mounting plate and a corresponding hole in the support structure.

13. The device housing of claim 9, wherein the support structure is coupled between each of the left and right mounting plate and the front panel by screws passing through each threaded interface on the front panel and a corresponding slot in the left or right mounting plate.

14. The device housing of claim 9, wherein each of the left and right mounting plates translate along an axis of the slot to transition between a locked position at which each securing tab on the mounting plate is coupled to a securing interface on a corresponding edge of the back panel and an unlocked position at which each securing tab is uncoupled to a securing interface on a corresponding edge of the back panel.

15. The device housing of claim 9, wherein a translation of each of the left and right mounting plate along the axis of a slot causes a protruding tab of each securing interface on the back panel to couple to a corresponding securing tab on the mounting plate.

16. The device housing of claim 9, wherein coupling each securing tab on the left and right mounting plate to a corresponding securing interface on the back housing causes the mounting plate to pull the front panel and the back panel towards the support structure.

17. A method for constructing a device housing, the method comprising:
aligning a hole in a support structure with a slot in a mounting plate;
mounting a front panel to the support structure by passing a screw through the slot in the mounting plate, the hole in the support structure, and a threaded interface on the front panel; and
mounting a back panel to the support structure by coupling a securing tab on mounting plate to a securing interface on the back panel.

18. The method of claim 17, further comprising:
aligning the threaded interface on the front panel with the slot in the mounting plate; and
coupling the front panel to the mounting plate by passing the screw through aligned slot and threaded interface.

19. The method of claim 17, further comprising:
positioning an outer wall of the mounting plate to abut the support structure to align the hole in the support structure, the slot in the mounting plate, and the threaded interface on the front panel.

20. The method of claim 17, further comprising:
translating the mounting plate along an axis of the slot to transition between a locked position at which the securing tab is coupled to the securing interface on the back panel and an unlocked position at which the securing tab is uncoupled to the securing interface on the back panel.

* * * * *

UNITED STATES PATENT AND TRADEMARK OFFICE
CERTIFICATE OF CORRECTION

PATENT NO. : 11,143,221 B2  
APPLICATION NO. : 16/575129  
DATED : October 12, 2021  
INVENTOR(S) : Joshua Davies et al.

Page 1 of 1

It is certified that error appears in the above-identified patent and that said Letters Patent is hereby corrected as shown below:

On the Title Page

In Column 2, item (57), under Abstract, Line 9, delete "to configured to" and insert -- tab configured to --, therefor.

In the Claims

In Column 6, Claim 5, Line 26, delete "panel be" and insert -- panel by --, therefor.

In Column 6, Claim 7, Line 37, delete "mount plate." and insert -- mounting plate. --, therefor.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*